(12) United States Patent
Hecht et al.

(10) Patent No.: US 8,080,092 B2
(45) Date of Patent: Dec. 20, 2011

(54) REFLUX CONDENSER APPARATUS AND METHOD

(75) Inventors: Thomas Hecht, Gauting (DE); Sepp Schuhbeck, Feichten (DE)

(73) Assignee: Linde Aktiengesellschaft, Wiesbaden (DE)

( * ) Notice: Subject to any disclaimer, the term of this patent is extended or adjusted under 35 U.S.C. 154(b) by 1107 days.

(21) Appl. No.: 11/834,470

(22) Filed: Aug. 6, 2007

(65) Prior Publication Data
US 2008/0035314 A1  Feb. 14, 2008

(30) Foreign Application Priority Data
Aug. 8, 2006 (DE) .......................... 10 2006 037 058

(51) Int. Cl.
*B01D 45/00* (2006.01)

(52) U.S. Cl. ............... 95/267; 95/288; 55/462; 165/157

(58) Field of Classification Search .................... 95/267, 95/288; 55/462, 465; 165/157
See application file for complete search history.

(56) References Cited

U.S. PATENT DOCUMENTS

| 3,720,071 | A | | 3/1973 | Nasser et al. |
| 4,124,069 | A | | 11/1978 | Becker |
| 5,730,002 | A | | 3/1998 | Collin et al. |
| 5,826,647 | A | * | 10/1998 | Engelhardt et al. ........ 165/134.1 |
| 6,128,920 | A | | 10/2000 | Matsuo et al. |
| 6,349,566 | B1 | | 2/2002 | Howard et al. |
| 2003/0221818 | A1 | | 12/2003 | Gentry et al. |

FOREIGN PATENT DOCUMENTS

| EP | 1 189 000 A2 | 3/2002 |
| FR | 2 431 103 A1 | 2/1980 |
| FR | 2 798 599 A1 | 3/2001 |

* cited by examiner

*Primary Examiner* — Robert A Hopkins
(74) *Attorney, Agent, or Firm* — Crowell & Moring LLP

(57) ABSTRACT

A reflux condenser and a method for conducting away liquid from the lower region of reflux passages, is disclosed. The reflux condenser has at least one heat exchanger block which has reflux passages and refrigerant passages, and a pressure container which encloses the heat exchanger block at the top and laterally. The reflux passages communicate at their lower end with a header which is arranged below the heat exchanger block and has a phase-separating device.

23 Claims, 1 Drawing Sheet

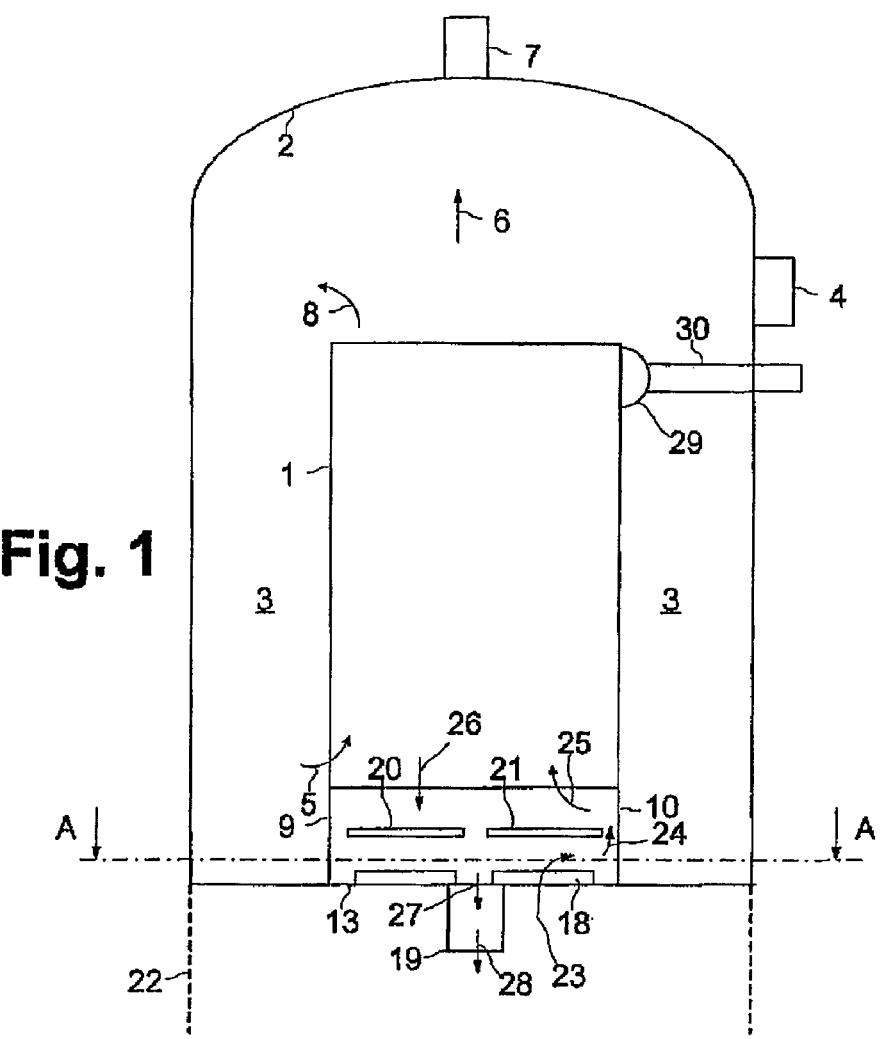
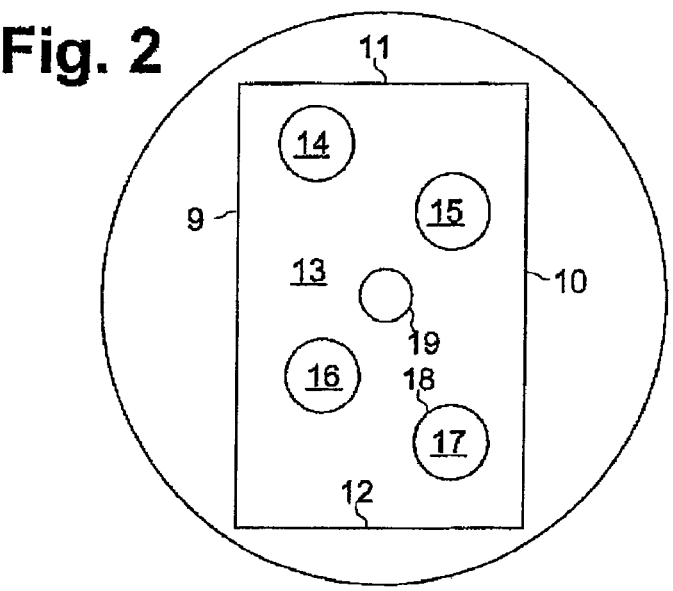

REFLUX CONDENSER APPARATUS AND METHOD

This application claims the priority of German Patent Document No. 10 2006 037 058.9, filed Aug. 8, 2006, the disclosure of which is expressly incorporated by reference herein.

BACKGROUND AND SUMMARY OF THE INVENTION

The invention relates to a reflux condenser and a method for conducting away liquid from the lower region of reflux passages.

Two fundamental types of reflux condensers are known. Either the heat exchanger block (or else a plurality of heat exchanger blocks) is arranged in the interior of a pressure container, as illustrated, for example, in EP 1189000 A2, or the heat exchanger block is closed on all sides by headers, see, for example, U.S. Pat. No. 6,128,920. The present invention relates to the first variant.

The reflux passages of a reflux condenser are subjected to steam from below. The steam partially condenses as it rises in the reflux passages. The reflux passages are constructed in such a manner that the condensed liquid is not entrained, but rather flows downwards. Rectification takes place in the reflux passages because of the counterflow of steam and liquid. The liquid which emerges at the lower end is enriched with components which are less easy to volatilize, and the steam emerging at the top with components which are more easy to volatilize.

A reflux condenser (also called dephlegmator) can be used as a stand alone separating unit. As an alternative, it is used as a top condenser of a separating column and reinforces the separating action thereof.

Spatial terms such as "at the top", "at the bottom", "laterally", etc., always refer here to the orientation of the reflux condenser during correct operation.

The invention is therefore based on improving the economic efficiency of a reflux condenser of the type mentioned at the beginning and, in particular, of achieving favorable production and/or operating costs.

With the present invention, the reflux passages communicate at their lower end with a header which is arranged below the heat exchanger block and has a phase-separating device.

The header constitutes at least part of the means for introducing steam into the lower region of the reflux passages and of the means for conducting away liquid from the lower region of the reflux passages.

Although the heat exchanger block of the reflux condenser according to the invention is installed in the interior of a pressure container, its reflux passages are not open to the intermediate space between the pressure container and heat exchanger block, but rather have a header. This may initially seem excessively complicated, but has the advantage of making it possible to arrange a phase-separating device in the header, which enables steam and liquid to be able to be effectively separated from each other below the reflux passages. This prevents, in particular, liquid from being entrained by the flow of steam. Overall, a particularly high degree of efficacy of the heat and substance exchange operation is achieved in the reflux condenser.

A further advantage of the structure according to the invention is that the interior of the pressure container, i.e., the intermediate space between the pressure container and heat exchanger block, can be used for different purposes and also can have a different pressure than the reflux passages.

The heat exchanger block is preferably manufactured as a plate heat exchanger, in particular as a soldered aluminum plate heat exchanger.

It is favorable if the phase-separating device arranged in the header has a base, the base containing at least one gas passage opening and the gas passage opening being provided on its upper side with a border for backing up liquid.

The liquid emerging from the reflux passages is therefore collected on the base. The rising steam which enters the reflux passages later on flows past the backed-up liquid via the gas passage opening without suffering a substantial loss in pressure and without entraining droplets of liquid in the process.

The border of the gas passage opening can be formed by one or more vertical walls, in the simplest case by means of a wall in the shape of a cylindrical casing with a vertical axis of symmetry. However, other border shapes are also conceivable, for example those which widen or taper. The border is preferably arranged directly on the edge of the gas passage opening, but may also be at a certain distance from the edge of the gas passage opening.

The lower side of the gas passage opening can be connected in terms of flow to the top of a separating column, so that the gas removed at the top thereof flows into the reflux passages.

The phase-separating device of the heat exchanger block has, for example, one to ten gas passage openings, preferably two to six gas passage openings.

The phase-separating device preferably has at least one discharge pipe for liquid backed up on the base. The liquid caught on the base is conducted away via the discharge pipe separately from the entering flow of steam.

The discharge pipe can be connected in terms of flow, for example, to a liquid distributor which distributes the liquid formed in the reflux passages to the substance exchange section of a separating column which contains systematic packing or filling. In the case of a plate column, the discharge pipe opens onto a column plate.

It is furthermore advantageous if, above the gas passage opening, a covering is arranged at a distance from the base and covers at least part of the cross-sectional area of the gas passage opening. This prevents liquid raining down from the reflux passages from passing into the gas passage opening. The covering preferably covers the entire cross section of the gas passage opening. The vertical distance from the base or from the upper edge of the border is selected in such a manner that the steam can flow through without a significant loss in pressure. The entire structure may be designed in accordance with the chimney base principle.

Within the context of the invention, the entering steam can be provided with a substantially larger cross-sectional area than in the case of a conventional header with a pipe connection. The cross section of the gas passage opening of the phase-separating device preferably amounts to at least a fortieth, in particular at least a twentieth, in particular at least a tenth, of the lower end surface of the heat exchanger block. If the phase-separating device has more than one gas passage opening, this dimension applies to the sum of the cross sections of all of the gas passage openings.

The header can have planar, in particular rectangular side walls, which are connected to the lower edges of the heat exchanger block. In addition, it can have a base which also forms the base of the phase-separating device. For example, it is overall in the shape of a cube, the upper end surface of which is formed by the lower end surface of the heat exchanger block.

The means for introducing refrigerant into the refrigerant passages are designed as lateral openings of the heat exchanger block, via which the refrigerant passages communicate with the intermediate space between the pressure container and heat exchanger block. The intermediate space can therefore be used for bringing up refrigerant without a header being required for this purpose. If the refrigerant is introduced in liquid form, the intermediate space between the pressure container and heat exchanger block can be used as a liquid bath. The lateral openings are then arranged in such a manner that they lie below the liquid surface during operation of the reflux condenser. They can be arranged on one or two sides of the heat exchanger block.

The refrigerant passages are also preferably upwardly open on the upper side of the heat exchanger block. This enables the refrigerant passages to be operated in the manner of a customary circulating evaporator (bath evaporator) with the aid of the thermosiphon effect without headers being required on the refrigerant side. The heat exchanger block then has just one further header at the lower end, in addition to the header described for the reflux passages, which further header serves as means for drawing steam out of the upper region of the reflux passages.

The invention and further details of the invention are explained in more detail below with reference to an exemplary embodiment illustrated schematically in the drawings.

BRIEF DESCRIPTION OF THE DRAWINGS

FIG. 1 shows a longitudinal section of an embodiment of a reflux condenser in accordance with the principles of the present invention.

FIG. 2 is a cross section in the plane A-A of FIG. 1.

DETAILED DESCRIPTION OF THE DRAWINGS

A heat exchanger block 1 is arranged in the interior of a pressure container 2. It is designed as a soldered aluminum plate heat exchanger and, in an alternating manner, has reflux passages and refrigerant passages, which are not illustrated in detail.

In the exemplary embodiment, the refrigerant passages function as a circulating evaporator. Liquid refrigerant is introduced via a connecting branch 4 into the intermediate space 3 between the pressure container 2 and heat exchanger block 1, where it forms a liquid bath. Liquid 5 flows out of the bath into the refrigerant passages via lateral openings of the refrigerant passages. By means of the thermosiphon effect, a two-phase mixture is guided upwards in the refrigerant passages and, on the upper side of the heat exchanger block 1, emerges from the refrigerant passages which are open at that point. Gaseous refrigerant 6 is drawn off via a gas line 7, and refrigerant 8 which has remained in liquid form drops back into the liquid bath.

The reflux passages are open at their lower end and communicate with a header which is arranged below the heat exchanger block 1. The header has four rectangular side walls 9, 10, 11, 12 and a base 13. The base 13 at the same time forms the base of a phase-separating device and, in the example, has four gas passage openings 14, 15, 16, and 17. The gas passage openings are provided on their upper side with a respective border 18 for backing up liquid. The backed-up liquid can flow off via a discharge pipe 19. A respective covering 20, 21 is arranged above the gas passage openings.

The reflux condenser is arranged directly on the top of a separating column. The column wall 22 is indicated in FIG. 1 by dashed lines. Steam 23 flows out of the column top via the gas passage openings, is deflected 24 by the coverings 20, 21 and finally flows into the reflux passages 25. Liquid 26 formed in the reflux passages emerges from the lower end thereof, if appropriate strikes against one of the coverings 20, 21, is backed up on the base 13 and finally flows off via the discharge pipe 19 as indicated by reference characters 27, 28. The portion which has remained in gaseous form is drawn from the reflux passages at the top via a lateral header 29 and a gas removal pipe 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reflux condenser comprising a heat exchanger block which has reflux passages and refrigerant passages, a pressure container which encloses the heat exchanger block at a top and laterally, means for introducing steam into a lower region of the reflux passages, means for conducting away liquid from the lower region of the reflux passages, means for drawing steam out of an upper region of the reflux passages, and means for introducing refrigerant into the refrigerant passages, wherein the reflux passages communicate at a lower end thereof with a header which is arranged below the heat exchanger block and has a phase-separating device.

2. The reflux condenser according to claim 1, wherein the phase-separating device has a base, wherein the base contains a gas passage opening and wherein the gas passage opening is provided on an upper side with a border for backing up liquid.

3. The reflux condenser according to claim 2, wherein the phase-separating device includes a discharge pipe for the liquid backed up on the base.

4. The reflux condenser according to claim 2, wherein, above the gas passage opening, a covering is arranged at a distance from the base and covers at least part of a cross-sectional area of the gas passage opening.

5. The reflux condenser according to claim 2, wherein a cross section of the gas passage opening of the phase-separating device amounts to at least a fortieth of a lower end surface of the heat exchanger block.

6. The reflux condenser according to claim 1, wherein the header has planar side walls which are connected to lower edges of the heat exchanger block.

7. The reflux condenser according to claim 2, wherein the header has a base which also forms the base of the phase-separating device.

8. The reflux condenser according to claim 1, wherein the means for introducing refrigerant into the refrigerant passages are designed as lateral openings of the heat exchanger block, via which the refrigerant passages communicate with an intermediate space between the pressure container and the heat exchanger block.

9. The reflux condenser according to claim 1, wherein a lateral intermediate space is arranged between the heat exchanger block and a wall of the pressure container.

10. A reflux condenser, comprising:
a heat exchanger block, wherein the heat exchanger block is enclosed by a pressure container; and
a header with a phase-separating device arranged below the heat exchanger block, wherein the phase-separating device includes a base and wherein the base has a gas passage opening;
and wherein a border surrounds the gas passage opening on an upper side of the base.

11. The reflux condenser according to claim 10, wherein the header includes planar side walls connected to lower edges of the heat exchanger block.

12. The reflux condenser according to claim 10, wherein a lateral intermediate space is arranged between the heat exchanger block and a wall of the pressure container.

13. A reflux condenser, comprising:
a heat exchanger block, wherein the heat exchanger block is enclosed by a pressure container; and
a header with a phase-separating device arranged below the heat exchanger block, wherein the phase-separating device includes a base and wherein the base has a gas passage opening;
and wherein the base has a discharge pipe disposed on a lower side of the base.

14. The reflux condenser according to claim 13, wherein a lateral intermediate space is arranged between the heat exchanger block and a wall of the pressure container.

15. A reflux condenser, comprising:
a heat exchanger block, wherein the heat exchanger block is enclosed by a pressure container; and
a header with a phase-separating device arranged below the heat exchanger block, wherein the phase-separating device includes a base and wherein the base has a gas passage opening;
and wherein a cover is arranged above the gas passage opening at a distance from the base.

16. The reflux condenser according to claim 15, wherein a lateral intermediate space is arranged between the heat exchanger block and a wall of the pressure container.

17. A reflux condenser, comprising:
a heat exchanger block, wherein the heat exchanger block is enclosed by a pressure container; and
a header with a phase-separating device arranged below the heat exchanger block;
in combination with a separating column, wherein the reflux condenser is arranged on a top of the separating column.

18. The reflux condenser according to claim 17, wherein a lateral intermediate space is arranged between the heat exchanger block and a wall of the pressure container.

19. A method of conducting away a liquid from a lower region of a reflux passage of a heat exchanger block of a reflux condenser, comprising the steps of:
flowing the liquid from the lower region of the reflux passage into a header which is arranged below the heat exchanger block; and
flowing the liquid through the header via a discharge pipe.

20. The method according to claim 19, further comprising the step of flowing the liquid off of a cover in the heat exchanger block.

21. The method according to claim 19, further comprising the step of introducing steam into the lower region of the reflux passage through the header.

22. The method according to claim 19, further comprising the step of separating steam from the liquid in the header.

23. The method according to claim 19, wherein the heat exchanger block is enclosed by a pressure container and wherein a lateral intermediate space is arranged between the heat exchanger block and a wall of the pressure container.

* * * * *